US012592861B2

(12) United States Patent　(10) Patent No.:　US 12,592,861 B2
Kum et al.　(45) Date of Patent:　Mar. 31, 2026

(54) ADAPTIVE BATCH PROCESSING METHOD AND SYSTEM

(71) Applicant: KOREA ELECTRONICS TECHNOLOGY INSTITUTE, Seongnam-si (KR)

(72) Inventors: Seung Woo Kum, Yongin-si (KR); Jae Won Moon, Seoul (KR); Seung Taek Oh, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 91 days.

(21) Appl. No.: 18/443,680

(22) Filed: Feb. 16, 2024

(65) Prior Publication Data

US 2024/0187312 A1　Jun. 6, 2024

Related U.S. Application Data

(63) Continuation of application No. PCT/KR2021/013486, filed on Oct. 1, 2021.

(30) Foreign Application Priority Data

Sep. 3, 2021　(KR) ......................... 10-2021-0117458

(51) Int. Cl.
*H04L 41/16*　(2022.01)
*H04L 67/61*　(2022.01)
(52) U.S. Cl.
CPC .............. *H04L 41/16* (2013.01); *H04L 67/61* (2022.05)
(58) Field of Classification Search
CPC ................................ H04L 41/16; H04L 67/61
See application file for complete search history.

(56) References Cited

U.S. PATENT DOCUMENTS 11,797,535 B1* 10/2023 Stefani .............. G06F 16/24553
2011/0154073 A1* 6/2011 Wang ...................... G06F 9/505
709/224

(Continued)

FOREIGN PATENT DOCUMENTS

JP 　　　2020-112901 A 　　7/2020
KR 　10-2017-0133364 A 　12/2017
KR 　10-2019-0110068 A 　9/2019

OTHER PUBLICATIONS

International Search Report and Written Opinion mailed May 26, 2022 in International Application No. PCT/KR2021/013486. (*English translation of ISR in 2 pages.*).

*Primary Examiner* — Scott B Christensen
*Assistant Examiner* — Zonghua Du
(74) *Attorney, Agent, or Firm* — Knobbe, Martens, Olson & Bear, LLP

(57) ABSTRACT

An adaptive batch processing and apparatus is proposed. The adaptive batch processing method may be performed by a system including a server which saves a model trained by machine learning and a client which transmits input data by connecting to the server while requesting an analysis result based on the model for the corresponding input data. The method may include measuring an amount of available resources of the server in the server, calculating a batch size using the amount of the available resources measured by the server, and transmitting information about the calculated batch size to the client. The method may further include generating batch data of a size reflecting the transmitted information by generating a queue of a plurality of input data at the client, transmitting the generated batch data to the server, and performing an analysis based on the model on the batch data received from the server.

9 Claims, 3 Drawing Sheets

S101
MEASURE AMOUNT OF AVAILABLE RESOURCE

S102
CALCULATE BATCH SIZE

S103
GENERATE BATCH DATA

S104
PERFORM ANALYSIS BASED ON MODEL

(56)          References Cited

U.S. PATENT DOCUMENTS

| | | | |
|---|---|---|---|
| 2014/0156707 A1* | 6/2014 | Sax | G06F 16/9024 |
| | | | 707/798 |
| 2015/0381549 A1* | 12/2015 | Word | H04L 67/1023 |
| | | | 709/203 |
| 2019/0311257 A1* | 10/2019 | Chang | G06N 3/063 |
| 2020/0125926 A1* | 4/2020 | Choudhury | G06N 3/0499 |
| 2020/0226453 A1* | 7/2020 | Luk | G06N 3/08 |
| 2020/0226458 A1* | 7/2020 | de Vangel | G06N 3/063 |
| 2021/0034374 A1 | 2/2021 | Saxena et al. | |
| 2021/0271520 A1* | 9/2021 | Basu | G06F 9/4881 |
| 2021/0406655 A1* | 12/2021 | Ngo | G06N 3/063 |
| 2022/0398229 A1* | 12/2022 | Roy | G06F 16/2386 |

* cited by examiner

20

INPUT DATA

10

200

BATCH DATA

100

10

110, 210

150, 250

130, 230

INPUTTER

CONTROLLER

DISPLAY

COMMUNICATOR

MEMORY 120, 220

140, 240

100, 200

CONTROLLER

QUEUE
GENERATOR — 151

BATCH
GENERATOR — 152

BATCH SIZE
CALCULATOR — 153

150

250

ADAPTIVE BATCH PROCESSING METHOD AND SYSTEM

CROSS REFERENCE TO RELATED APPLICATIONS

This is a continuation application of International Patent Application No. PCT/KR2021/013486, filed on Oct. 1, 2021, which claims priority to Korean patent application No. KR 10-2021-0117458 filed on Sep. 3, 2021, contents of each of which are incorporated herein by reference in their entireties.

BACKGROUND

Technical Field

The present disclosure relates to a batch processing method and system, and more particularly, to an adaptive batch processing method and system for improving performance and resource utilization of an analysis service when providing a machine learning-based analysis service.

Description of Related Technology

Recently, with the development of machine learning technologies such as deep learning, techniques for providing analysis by configuring a service based on a trained model have been proposed.

SUMMARY

One aspect is an adaptive batch process technology of resource recognition that takes into account a state of each resource when providing a machine learning-based analysis service.

Another aspect is a method performed by a system including a server which saves a model trained by machine learning and a client which transmits input data by connecting to the server while requesting an analysis result based on the model for the corresponding input data, respectively, including: measuring, by the server, an amount of available resources of the server; calculating a batch size using the amount of available resources measured by the server, and transmitting information about the calculated batch size to the client; generating batch data of a size reflecting the transmitted information by generating a queue of a plurality of input data in the client, and transmitting the generated batch data to the server; and performing analysis based on the model of the batch data received from the server.

Another aspect is a method performed by a system including a server which saves a model trained by machine learning and a client which transmits input data by connecting to the server while requesting an analysis result based on the model for the corresponding input data, respectively, including: measuring, by the server, an amount of available resources of the server and transmitting the measured amount of available resources to the client; calculating a batch size using the amount of available resources transmitted from the client; generating batch data of a size reflecting the batch size by generating a queue of a plurality of input data in the client and transmitting the generated batch data to the server; and performing analysis based on the model on the batch data received from the server.

The amount of available resources may include a processor load size and a free size of memory of the server.

When generating the batch data, in a case where a collection time of the plurality of input data corresponding to the batch size exceeds a delay time of quality of service (QoS) required for the analysis, batch data of a size smaller than the batch size may be generated.

When calculating the batch size, the batch size may be calculated using the amount of available resources of the server and an average size of input data previously transmitted from the client to the server, respectively.

Another aspect is a system including a server which saves a model trained by machine learning and a client which transmits input data by connecting to the server while requesting an analysis result based on the model for the corresponding input data, including: a resource amount measurer that measures an amount of available resources of the server; a batch size calculator that calculates a batch size using the amount of available resources; a queue generator that is included in the client to generate a queue of a plurality of input data in the client; a batch generator that is included in the client to generate batch data reflecting the batch size in the generated queue; and a model analyzer that is included in the server to perform analysis on the batch data received from the client based on the model.

In a case where a collection time of the plurality of input data corresponding to the batch size exceeds a delay time of quality of service (QoS) required for the analysis, the queue generator may generate batch data of a size smaller than the batch size.

The batch size calculator may calculate the batch size using the amount of available resources of the server and an average size of input data previously transmitted from the client to the server, respectively.

According to the present disclosure configured as described above, it is possible to analyze batch data according to a batch size calculated through measurement of available resources, and provide an analysis service based on adaptive batch processing with more improved performance.

That is, according to the present disclosure, it is possible to implement resource optimization and improvement in machine learning-based analysis service performance by measuring a batch size optimized for available resources, rather than an arbitrary fixed batch size.

Effects which can be achieved by the present disclosure are not limited to the above-described effects. That is, other objects that are not described may be obviously understood by those skilled in the art to which the present disclosure pertains from the following description.

DETAILED DESCRIPTION

Figure 1:
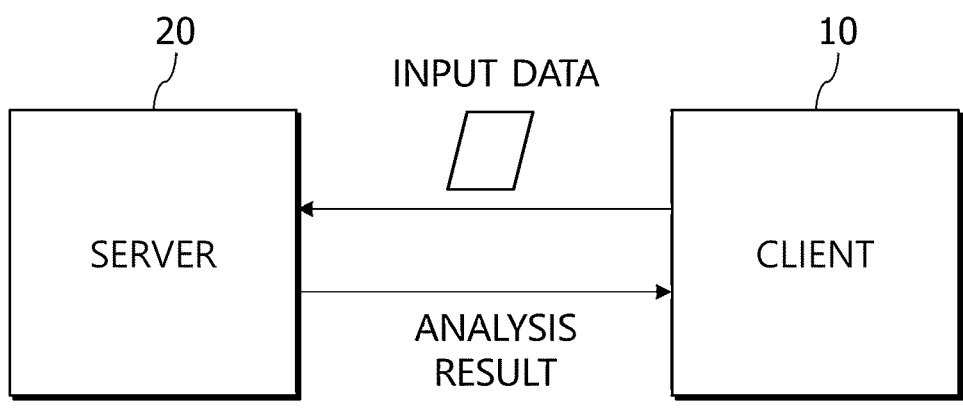
FIG. 1 is a diagram illustrating a configuration diagram for an analysis service using a machine learning model.

FIG. 1 illustrates a configuration diagram for an analysis service using a machine learning model. For example, referring to FIG. 1, analysis services such as TensorFlow Serving and PyTorch Serving places a model trained using machine learning on a server 20 and provide analysis (or inference) using the corresponding model to a client 10 through representational state transfer application programming interface (REST API) or remote procedure call (RPC) protocol. That is, the client 10 transmits input data, to which the analysis service is provided, to a server 20 through the corresponding protocol, so the server 20 analyzes the received input data based on the model and transmits the analysis result to the client 10.

Meanwhile, as the technologies of improving the performance of the analysis service, there is batch processing. That is, the batch processing is a technology of generating a batch that appropriately bundles analysis objects and requesting analysis for the corresponding batch, without requesting each time the analysis objects one by one. For example, the time it takes to process one data is 100 ms, and the time it takes to sequentially process 10 data is 1000 ms. However, when these 10 data are bundled and processed in one batch, these 10 data may be processed in time of less than 1000 ms.

However, this batch processing technology is greatly affected by computing resources. For example, when 1000 MB of batch data is input when only 100 MB of available memory remains in the computing resources, the corresponding data may not be processed normally, or the processing time may increase rather than processing the data sequentially one by one.

The above objects, means, and effects of the present disclosure will become more obvious from the following detailed description associated with the accompanying drawings. Therefore, those skilled in the art to which the present disclosure pertains may easily practice a technical idea of the present disclosure. Further, in describing the present disclosure, in the case in which it is decided that a detailed description of a well-known technology associated with the present disclosure may unnecessarily make the gist of the present disclosure unclear, it will be omitted.

Terms used in the present specification are for explaining embodiments rather than limiting the present disclosure. In this specification, a singular form also includes a plural form, unless specifically stated in the text. In this specification, terms such as "include," "comprise," "provide," or "have" do not exclude the presence or addition of one or more other components other than the mentioned components.

In this specification, terms such as "or," "at least one," may represent one of words listed together, or a combination of two or more. For example, "or B" "and at least one of B" may include only one of A or B, and may include both A and B.

In this specification, descriptions under "for example" and the like may not exactly match presented information, such as cited characteristics, variables, or values, and should not limit embodiments of the invention according to various embodiments of the invention to the effects of modifications in addition to tolerances, measurement errors, limits of measurement accuracy, and other commonly known factors.

In this specification, it is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

In this specification, it is to be understood that when one component is referred to as being "on" or "in contact with" another component, it may be connected directly to or coupled directly to another component or be connected to or coupled to another component with the other component interposed therebetween. On the other hand, when one component is described as being "right above" or "in direct contact" with another component, it may be understood that there is no other component present therebetween. Other expressions describing the relationship between the components, for example, "between," "directly between," and the like may be interpreted similarly.

In this specification, terms "first," "second," and the like, may be used to describe various components, but the components are not to be construed as being limited by these terms. In addition, the above term should not be interpreted as limiting the order of each component, but may be used for the purpose of distinguishing one component from another component. For example, a "first component" may be named a "second component" and the "second component" may also be similarly named the "first component."

Unless defined otherwise, all terms used in the present specification have the same meaning as meanings commonly understood by those skilled in the art to which the present disclosure pertains. In addition, terms defined in commonly used dictionary are not ideally or excessively interpreted unless explicitly defined otherwise.

Hereinafter, exemplary embodiments of the present disclosure will be described in detail with reference to the accompanying drawings.

Figure 2:
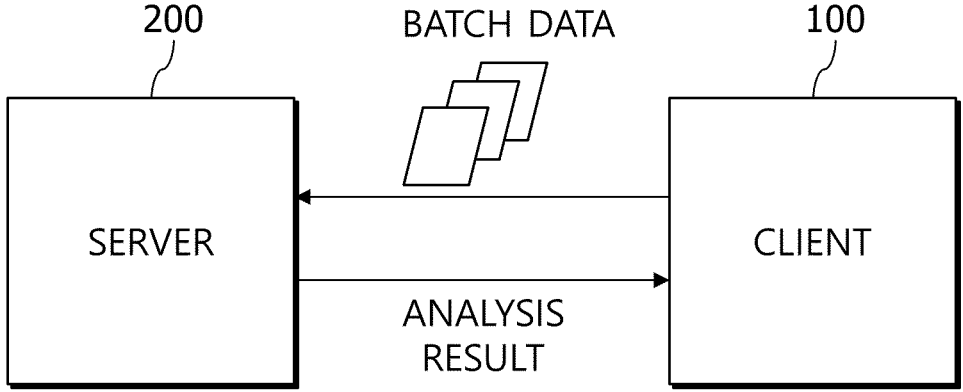
FIG. 2 is a diagram illustrating an operation configuration diagram of a system 10 according to an embodiment of the present disclosure.
Figure 3:
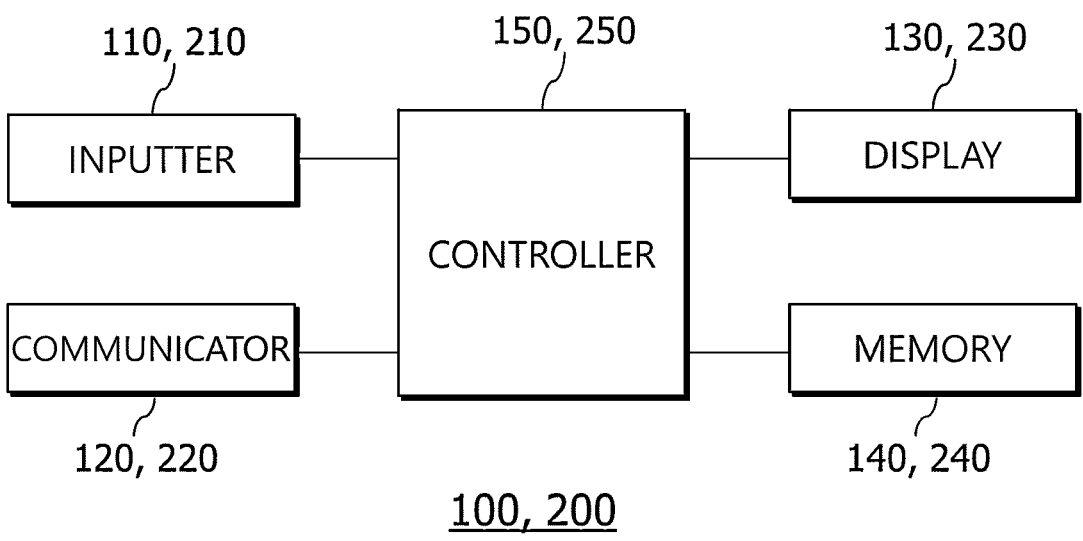
FIG. 3 is a block configuration diagram of a client 100 and a server 200 according to an embodiment of the present disclosure.

FIG. 2 illustrates an operation configuration diagram of the system 10 according to an embodiment of the present disclosure, and FIG. 3 illustrates a block configuration diagram of a client 100 and a server 200 according to an embodiment of the present disclosure.

Recently, a machine learning technology is improving sufficiently to provide high levels of accuracy, and application fields of machine learning technology are also expanding to include image, voice, and sequential data. With the development of the machine learning technology, technologies to support the deployment of trained machine learning models are also rapidly expanding.

For example, Google announced TensorFlow Serving in late 2017, and has proposed a server-client based analysis service that places machine learning models trained with its TensorFlow in a cloud, etc., in the form of service and transmits an analysis target to the corresponding service to remotely receive an analysis result.

The technology is continuously being developed with the support of open source camps. In particular, Seldon has been receiving a lot of attention recently as it provides a docker container conversion tool for already developed machine learning models. Seldon performs simple refactoring of previously developed machine learning models according to a template provided by Seldon and then automatically creates a docker container that may be deployed in a cloud by inputting the machine learning models to a tool provided by Seldon. In this process, by automatically creating a RESTful or gRPC-based interface which may access the corresponding machine learning models, Seldon presents a method of developers that deploy very easily services the developers can develop.

When providing the analysis service, the present disclosure provides a technology for improving service performance by providing the corresponding service based on adaptive batch processing.

That is, the system 10 according to the embodiment of the present disclosure is a system for providing analysis services according to adaptive batch processing, and as illustrated in FIG. 2, includes the client 100 and the server 200.

In this case, the client 100 transmits batch data including a plurality of input data and requests analysis of the corresponding input data. In addition, the server 200 saves a model trained by machine learning, performs analysis on batch data received from the client 100 based on the corresponding model, and transmits the analysis result to the client 100.

The client 100 and the server 200 may be electronic devices capable of computing or computing networks.

For example, the electronic device may include a desktop personal computer (PC), a laptop PC, a tablet PC, a netbook computer, a workstation, personal digital assistant (PDA), a smartphone, a smartpad, a mobile phone, or the like, but is not limited thereto.

As illustrated in FIG. 1, the client 100 and the server 200 include inputters 110 and 210, communicators 120 and 220, displays 130 and 230, memories 140 and 240, and controllers 150 and 250.

The inputters 110 and 210 generate input data in response to user input and may include various input means. For example, the inputters 110 and 210 may include a keyboard, a key pad, a dome switch, a touch panel, a touch key, a touch pad, a mouse, a menu button, and the like, but is not limited thereto.

The communicators 120 and 220 are components that perform communication with other devices. That is, the communicator 120 of the client 100 may transmit and receive various data with the communicator 220 of the server 200. For example, the communicators 120 and 220 may perform wireless communication such as 5th generation communication (5G), long term evolution-advanced (LTE-A), long term evolution (LTE), Bluetooth, Bluetooth low energy (BLE), and near field communication (NFC), and wireless fidelity (WiFi) communication, or perform wired communication such as cable communication, but is not limited thereto. For example, the communicators 120 and 220 may transmit and receive information about a model, information about the amount of available resources, information about a batch size, batch data, information about an analysis result, etc., to and from each other.

The displays 130 and 230 display various image data on a screen and may be composed of a non-emissive panel or an emissive panel. For example, the displays 130 and 230 may include a liquid crystal display (LCD), a light emitting diode (LED) display, an organic LED (OLED) display, a micro electro mechanical systems (MEMS) display, and an electronic paper display, or the like, but is not limited thereto. In addition, the displays 130 and 230 may be coupled with the inputters 110 and 210 and implemented as a touch screen, etc.

The memories 140 and 240 store various pieces of information necessary for the operations of the client 100 and the server 200. The stored information may include the information about the model, the information about the amount of available resources, the information about the batch size, the batch data, the information about the analysis result, program information related to an adaptive batch processing method to be described below, and the like, but is limited thereto. For example, the memories 140 and 240 may include a hard disk type, a magnetic media type, a compact disc read only memory (CD-ROM), an optical media type, a magneto-optical media type, a multimedia card micro type, a flash memory type, a read only memory type, a random access memory type, or the like, depending on their type, but is not limited thereto. In addition, the memories 140 and 240 may be a cache, a buffer, a main memory, an auxiliary memory, or a separately provided storage system depending on their purpose/location, but are not limited thereto.

The controllers 150 and 250 may perform various control operations of the client 100 and the server 200. That is, the controllers 150 and 250 may control the performance of the adaptive batch processing method to be described later, and control the operations of the remaining components of the client 100 and the server 200, that is, the inputters 110 and 210, the communicators 120 and 220, the displays 130 and 230, the memories 140 and 240, and the like. For example, the controllers 150 and 250 may include a processor that is hardware, a process that is software executed on the corresponding processor, or the like, but are not limited thereto.

Figure 4:
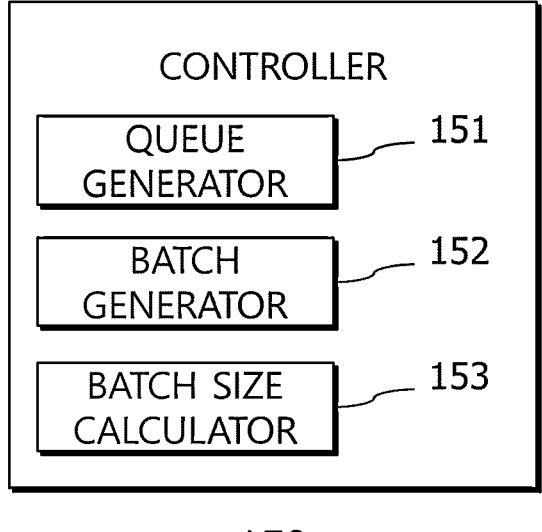
FIG. 4 is a block configuration diagram of a controller 150 in the client 100.
Figure 5:
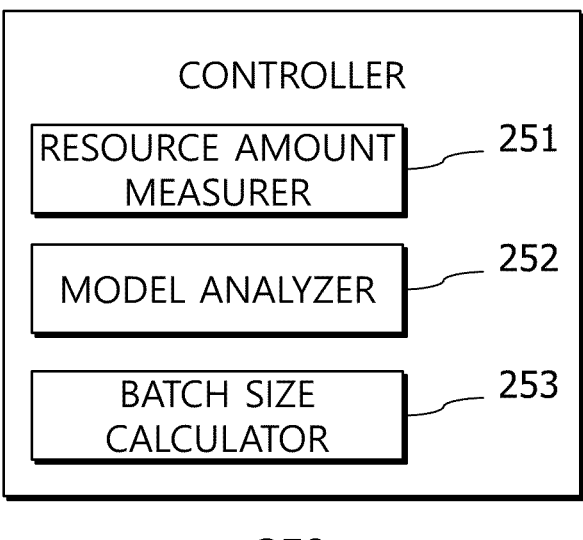
FIG. 5 is a block configuration diagram of the controller 250 in the server 200.

FIG. 4 illustrates a block configuration diagram of the controller 150 in the client 100, and FIG. 5 illustrates a block configuration diagram of the controller 250 in the server 200.

Referring to FIG. 4, the controller 150 of the client 100 may include a queue generator (or a queue generation processor) 151 and a batch generator (or a batch generation processor) 152 to control the performance of the adaptive batch processing method to be described below, and further include a batch size calculator (or a batch size calculation processor) 153. In addition, referring to FIG. 5, the controller 250 of the server 200 may include a resource amount measurer (or a resource amount measurement processor) 251 and a model analyzer (or a model analysis processor) 252 to control the performance of the adaptive batch processing method to be described below, and further include a batch size calculation unit 253.

In the adaptive batch processing method to be described below, the batch size calculator 253 of the server 200 may operate or the batch size calculator 153 of the client 100 may operate to calculate the batch size. Hereinafter, the case where the batch size calculator 253 of the server 200 operates to calculate the batch size is referred to as a "first embodiment," and the case where the batch size calculator 153 of the client 100 operates to calculate the batch size is referred to as a "first embodiment." That is, in the first embodiment, the server 200 may further include the batch size calculator 253, and in the second embodiment, the client 100 may further include the batch size calculator 153.

For example, the queue generator 151, the batch generator 152, and the batch size calculator 153 may be hardware components of the controller 150 or may be processes that are software executed in the controller 150, but is not limited thereto. In addition, the resource amount measurer 251, the model analyzer 252, and the batch size calculator 253 may be hardware components of the controller 250 or may be processes that are software executed in the controller 250, but are not limited thereto.

Meanwhile, the model previously stored in the server 200 is a machine learning model trained according to machine learning using training data. For example, the training data may include input data and output data pairs (data sets). In this case, the model includes a plurality of layers and has a function for the relationship between input data and output data. That is, when the input data is input to the model, the output data according to the corresponding function may be output.

For example, the machine learning applied to the model may include an artificial neural network, Boosting, Bayesian statistics, a decision tree, Gaussian process regression, a nearest neighbor algorithm, a support vector machine, random forests, symbolic machine learning, ensembles of classifiers, deep learning, or the like, but is not limited thereto.

In particular, when the model is a deep learning model trained by deep learning, the relationship between the input data and the output data is expressed in the plurality of layers, and the plurality of expression layers are called "artificial neural network." Each layer in the artificial neural network is composed of at least one filter, and each filter has a matrix of weights. In other words, each element in the matrix of the corresponding filter may correspond to a weighted value.

For example, the deep learning may include a deep neural network (DNN), a convolutional neural network (CNN), a recurrent neural network (RNN), a restricted Boltzmann machine (RBM), a deep belief network (DBN), deep Q-networks, and the like, but is not limited thereto.

Hereinafter, the adaptive batch processing method according to the present disclosure will be described in more detail.

Figure 6:
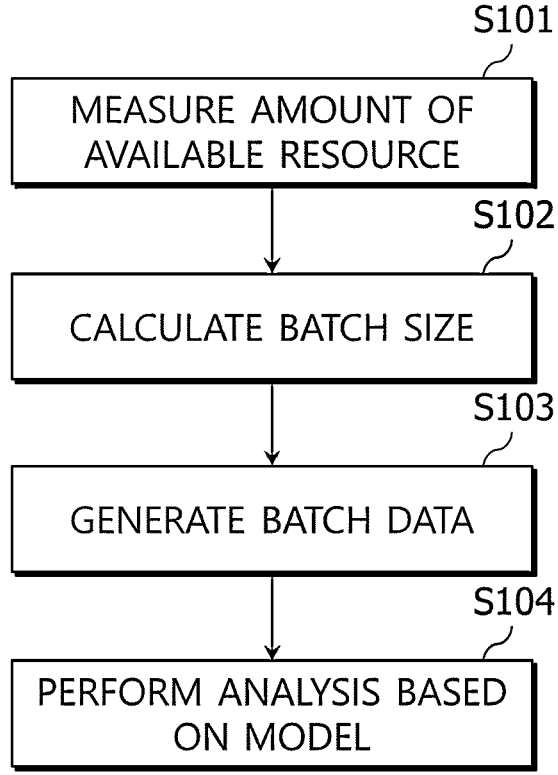
FIG. 6 is a flowchart of an adaptive batch processing method according to an embodiment of the present disclosure.

FIG. 6 is a flowchart of an adaptive batch processing method according to an embodiment of the present disclosure.

That is, referring to FIG. 6, the adaptive batch processing method according to the embodiment of the present disclosure includes measuring the amount of available resources (S101), calculating a batch size (S102), generating batch data (S103), and performing analysis on the batch data based on a model (S104). However, in S101 to S104, an execution entity, a transmission entity, and the like may vary according to the first or second embodiment to be described below.

First Embodiment

In S101, the resource amount measurer 251 of the server 200 measures the amount of available resources (hereinafter referred to as "amount of available resources") of the server 200. In this case, the available resources refer to remaining resources currently available in the processor or memory 140 in the server 200. That is, the available resources may include a load size of the processor, a free size of the memory 140, and the like.

For example, the processor is a central processing unit (CPU), a graphic processing unit (GPU), or the like, included in the controller 250, and as the utilization rate increases, the load size of the processor increases. In addition, as the usage of the memory 140 increases, the free size of the memory 140 decreases. Accordingly, the lower the processor load and the larger the free size of the memory 140, the more available resources.

Next, in S102, the batch size calculator 253 of the server 200 calculates the batch size using the amount of available resources measured in S101. Of course, the batch size calculator 253 may calculate the batch size by using an average size of input data (or batch data) previously transmitted from the client 100 to the server 200, in addition to the amount of available resources of the server 200.

For example, the batch size calculator 253 may derive information about a larger batch size as the amount of available resources measured in S101 increases. In addition, the batch size calculator 253 may derive information about a larger batch size as the average size of the previously transmitted input data (or batch data) increases.

Of course, the batch size may be calculated by applying different weights to the amount $I_1$ of available resources measured in S101 and an average size $I_2$ of previously transmitted input data (or batch data). For example, the batch size B may be derived through the following equation, but is not limited thereto.

$$B = \alpha A = \alpha(w_1 I_1 + w_2 I_2)$$

In this case, $\alpha$ is a coefficient of A, and A is $w_1 I_1 + w_2 I_2$. In addition, $w_1$ denotes a weight of $1_1(0 < w_1 \leq 1)$, and $w_2$ denotes a weight of $1_2(0 < w_2 \leq 1)$.

Thereafter, the controller 250 of the server 200 transmits the information about the calculated batch size to the client 100 through the communicator 220. Accordingly, the communicator 120 of the client 100 receives the information about the corresponding batch size from the server 200.

Next, in S103, the queue generator 151 of the client 100 generates the queue for the plurality of input data. Thereafter, the batch generator 152 of the client 100 generates the batch data. In this case, the batch generator 152 generates batch data of a size that reflects the information about the batch size received from the server 200. For example, the batch generator 152 may include a plurality of input data and generate batch data of a size corresponding to the batch size, or may generate batch data of a size smaller than the corresponding size.

In particular, the batch generator 152 may generate batch data of a size that reflects quality of service (QoS). For example, when a collection time of the plurality of input data corresponding to the batch size exceeds a delay time of quality of service (QoS) required for analysis, the batch generator 152 may generate batch data of a size smaller than the batch size.

Thereafter, the communicator 120 of the client 100 transmits the generated batch data to the server 20. Accordingly, the communicator 220 of the server 200 receives the corresponding batch data from the client 100.

Next, in S104, the model analyzer 252 of the server 200 performs analysis on the received batch data based on the model previously stored in the memory 240. That is, the model analyzer 252 may input the received batch data (a plurality of input data) to the model and derive result data (i.e., analysis result) for the received batch data.

Thereafter, the controller 250 of the server 200 transmits information about the derived analysis result to the client 100 through the communicator 220. Accordingly, the communicator 120 of the client 100 receives the information about the corresponding analysis result from the server 200.

Second Embodiment

In S101, the resource amount measurer 251 of the server 200 measures the amount of available resources of the server 200. However, the detailed information about the amount of available resources is the same as described above in the first embodiment, and therefore, will be omitted below.

The controller 250 of the server 200 transmits information about the measured amount of available resources to the client 100 through the communicator 220. Accordingly, the communicator 120 of the client 100 receives the information about the amount of available resources from the server 200.

Next, in S102, the batch size calculator 153 of the server 100 calculates a batch size using the amount of received available resources measured in S101. Of course, the batch size calculator 153 may calculate the batch size by using an average size of input data (or batch data) previously transmitted from the client 100 to the server 200, in addition to the amount of available resources of the server 200. However, the detailed information regarding the operation of the batch size calculator 153 is the same as described above for the batch size calculator 253 in the first embodiment, and therefore, will be omitted below.

Next, in S103, the queue generator 151 of the client 100 generates a queue for a plurality of input data, and the batch generator 152 of the client 100 generates the batch data. However, the details of S103 are the same as described above in the first embodiment except for using the batch size calculated by the client 100 itself, and therefore, will be omitted below.

Thereafter, the communicator 120 of the client 100 transmits the generated batch data to the server 20. Accordingly, the communicator 220 of the server 200 receives the corresponding batch data from the client 100.

Next, S104 is the same as described above in the first embodiment, and therefore, will be omitted below.

According to the present disclosure configured as described above, it is possible to analyze the batch data according to the batch size calculated through the measurement of available resources, and provide the analysis service based on the adaptive batch processing with more improved performance. That is, according to the present disclosure, it is possible to implement the resource optimization and improvement in machine learning-based analysis service performance by measuring the batch size optimized for available resources, rather than the arbitrary fixed batch size.

Meanwhile, although specific embodiments have been described in the detailed description of the present disclosure, various modifications are possible without departing from the scope of the present disclosure. Therefore, the scope of the present disclosure is not limited to the described embodiments, but should be defined by the claims described below and their equivalents.

The present disclosure may provide an adaptive batch process technology of resource recognition that takes into consideration a state of each resource when providing machine learning-based analysis services, and therefore, has industrial applicability.

What is claimed is:

1. A method performed by a system including a server which saves a model trained by machine learning and a client which transmits input data by connecting to the server while requesting an analysis result based on the model for the corresponding input data, respectively, the method comprising:

measuring, by the server, an amount of available resources of the server;

calculating a batch size, and transmitting information about the calculated batch size to the client;

generating batch data of a size reflecting the transmitted information by generating a queue of a plurality of input data in the client, and transmitting the generated batch data to the server; and performing analysis based on the model on the batch data received from the server, wherein the batch size is calculated by multiplying a preset coefficient with a sum of (i) the amount of available resources multiplied by a first weight and (ii) an average size of input data multiplied by a second weight, the input data having been previously transmitted from the client to the server.

2. The method of claim 1, wherein the amount of available resources includes a processor load size and a free size of memory of the server.

3. The method of claim 1, wherein, when generating the batch data, in response to a collection time of the plurality of input data corresponding to the batch size exceeding a delay time of quality of service (QoS) required for the analysis, batch data of a size smaller than the batch size is generated.

4. A method performed by a system including a server which saves a model trained by machine learning and a client which transmits input data by connecting to the server while requesting an analysis result based on the model for the corresponding input data, respectively, the method comprising:

measuring, by the server, an amount of available resources of the server and transmitting the measured amount of available resources to the client;

calculating a batch size;

generating batch data of a size reflecting the batch size by generating a queue of a plurality of input data in the client and transmitting the generated batch data to the server; and performing analysis based on the model on the batch data received from the server, wherein the batch size is calculated by multiplying a preset coefficient with a sum of (i) an amount of available resources multiplied by a first weight and (ii) an average size of input data multiplied by a second weight, the input data having been previously transmitted from the client to the server.

5. The method of claim 4, wherein the amount of available resources includes a processor load size and a free size of memory of the server.

6. The method of claim 4, wherein, when generating the batch data, in response to a collection time of the plurality of input data corresponding to the batch size exceeding a delay time of quality of service (QoS) required for the analysis, batch data of a size smaller than the batch size is generated.

7. A system including a server which saves a model trained by machine learning and a client which transmits input data by connecting to the server while requesting an analysis result based on the model for the corresponding input data, the system comprising:

a resource amount measurement processor configured to measure an amount of available resources of the server;

a batch size calculation processor configured to calculate a batch size;

a queue generation processor included in the client and configured to generate a queue of a plurality of input data in the client;

a batch generation processor included in the client and configured to generate batch data reflecting the batch size in the generated queue; and a model analysis processor included in the server and configured to perform analysis on the batch data received from the client based on the model, wherein the batch size is configured to be calculated by multiplying a preset coefficient with a sum of (i) an amount of available resources multiplied by a first weight and (ii) an average size of input data multiplied by a second weight, the input data having been previously transmitted from the client to the server.

8. The system of claim 7, wherein the available resource includes a processor load size and a free size of memory of the server.

9. The system of claim 7, wherein, in response to a collection time of the plurality of input data corresponding to the batch size exceeding a delay time of quality of service (QoS) required for the analysis, the queue generation processor is configured to generate batch data of a size smaller than the batch size.

* * * * *